United States Patent [19]

Bingham

[11] Patent Number: 5,206,886
[45] Date of Patent: Apr. 27, 1993

[54] METHOD AND APPARATUS FOR CORRECTING FOR CLOCK AND CARRIER FREQUENCY OFFSET, AND PHASE JITTER IN MULICARRIER MODEMS

[75] Inventor: John A. C. Bingham, Palo Alto, Calif.

[73] Assignee: Telebit Corporation, Sunnyvale, Calif.

[21] Appl. No.: 509,462

[22] Filed: Apr. 16, 1990

[51] Int. Cl.$^5$ .................................................. H04L 27/06
[52] U.S. Cl. ..................................... 375/97; 455/258
[58] Field of Search .................... 375/97, 98, 118, 119, 375/120; 331/1 R, 23; 455/258, 260, 265

[56] References Cited

U.S. PATENT DOCUMENTS

| | | | |
|---|---|---|---|
| 4,298,986 | 11/1985 | Hughes | 375/97 |
| 4,514,855 | 4/1985 | Lang et al. | 328/155 |
| 4,947,409 | 8/1990 | Raith et al. | 455/256 |
| 5,012,491 | 4/1991 | Iwasaki | 375/97 |

OTHER PUBLICATIONS

John A. C. Bingham "Theory and Practice of Modem Design", John Wiley & Sons pp. 182-185, 1988.
D. D. Flaconer "Jointly Adapive Equalizaion and Carrier Recovery in Two-Dimensional Digital Communication System", Bell System Tech J. vol. 55 pp. 317-334, Mar. 1976.
B. Hirosaki et al. "A 19.2K KBPS Voiceband Data Modem Based on Orthoganility Multiplexed QAM Techniques" IEEE Int. Con. Comm. Rec. pp. 661-665, Aug. 1985.
R. Roy, A. Paulras and T. Kailath "Esprit"—A Subspace Rotation Approach to Estimation of Parameters of CISOIDS in NDISE IEEE Trans ASP vol. ASSP 34 pp. 1340-1342 Oct. 1986.

*Primary Examiner*—Stephen Chin
*Attorney, Agent, or Firm*—Allston L. Jones

[57] ABSTRACT

A method of correcting for the impairments of phase jitter and frequency offset imposed by a transmission medium and of a clock frequency difference between a transmitting and a receiving multicarrier modem is disclosed. The method comprises two modes: a training mode that uses pilot tones, and a data mode that uses random data modulated onto many carriers. During the training mode the frequencies of the phase jitter are estimated, and the parameters of a correcting signal are initialized; during the data mode the correcting signal is used to compensate for the impairments, and then is updated from an estimate of the phase error.

20 Claims, 3 Drawing Sheets

METHOD AND APPARATUS FOR CORRECTING FOR CLOCK AND CARRIER FREQUENCY OFFSET, AND PHASE JITTER IN MULICARRIER MODEMS

BACKGROUND OF THE INVENTION

1. Field of the Invention

The invention pertains generally to data transmission and reception, and, more particularly, to the reception of high speed data that has been used to modulate many carriers. This method of modulation is know by many names—Orthogonally Multiplexed Quadrature Amplitude Modulation (OMQAM), Dynamically Assigned Multiple QAM (DAMQAM), Orthogonal Frequency Division Multiplexing (OFDM); herein it is referred to as multicarrier modulation.

2. Prior Art

In general, oscillators (frequency sources) in the transmitting and receiving modems of a data communication link cannot by synchronized, and the receiving modem must use special circuitry or signal processing algorithms to adapt itself to the data rate and carrier frequency(ies) of the received signal; this task is often referred to as clock and carrier recovery.

The task is complicated by the introduction in some transmission media, most notably the General Switched Telephone Network (GSTN), of frequency offset and phase jitter as shown in FIG. 1. Frequency offset, designated herein as f, is the difference between the frequency(ies) of the received carrier(s) and the reference carrier(s) generated in the local receiver; it may be caused by (a) a frequency difference between the carrier(s) used in the transmitter and the reference carrier(s) in the receiver and/or (b) a mismatch between the frequencies of the modulating and demodulating carriers in Frequency Division Multiplexing (FDM) equipment in the network; on the GSTN the resultant combined offset may be as much as 5 Hz. Phase jitter is seen as phase modulation of the received signal, and often has a few discrete, identifiable frequency components; the power supply frequency and telephone ringing frequency (60 Hz and 20 Hz, respectively, in the U.S.A.) are common components. The carrier recovery circuitry or algorithms must track, or follow frequency offset and phase jitter in order to ameliorate their effect on the received signal.

Circuitry and algorithms for recovering clock and carrier (including tracking frequency offset and phase jitter) from data-modulated single-carrier signals have been well documented in the literature (see J. A. C. Bingham, *The Theory and Practice of Modem Design.* John Wiley, 1988). Nearly all of the prior art uses phase-locked loops (PLLs) of one form or another, and designers have long recognized the harmful effects of delay inside those loops. For carrier recovery it was agreed that tracking of phase jitter is made much more difficult, maybe even impossible, if the delay of an adaptive equalizer (typically about 10 ms) is included in the loop; therefore special algorithms (see, for example, D. D. Falconer, "Jointly Adaptive Equalization and Carrier Recovery in Two-Dimensional Communications Systems", *Bell Syst. Tech J.*, vol. 55, pp. 317–334, March 1976) were developed to remove this delay from the loop.

In multicarrier modulation, data are grouped into blocks of bits; in the systems described by Baran (U.S. Pat. No. 4,438,511) and Hughes-Hartogs (U.S. Pat. No. 4,679,227) the blocks may comprise more than one thousand bits. Each carrier is modulated by just a few of those bits, and the modulation is held constant for the duration of one block; this duration, or symbol period, may therefore be several hundred times the symbol period of a single-carrier modem. Furthermore, the symbol period may be much greater than the periods of the components of the phase jitter that are to be tracked.

Signal processing in the multicarrier receiver must be performed at the symbol rate, and information about the received signal—data contained therein and imperfections (frequency offset, phase jitter, etc.) thereof—is available only after each block has been processed. This delay of one symbol period, which may be as large as 130 ms (more than ten times the delay through most adaptive equalizers), therefore appears inside the carrier recovery loop, and makes conventional jitter tracking impossible.

The long symbol period associated with multicarrier modulation makes the tracking of phase jitter imposed on multi-carrier signals a much more difficult problem than for single-carrier signals. One proposal (B. Hirosaki, et al, "A 19.2 kbit/s Voiceband Data Modem Based on Orthogonally Multiplexed QAM Techniques", *IEEE Intl. Conf. Commun. Rec.*, pp. 661–665, August 1985) was to input an unmodulated pilot tone to a set (one for each carrier) of adaptive jitter predictors, and feed the output signals forward to cancel the jitter on each modulated carrier. This approach has several disadvantages: the amount of information about the jitter available from one pilot placed at the edge of the available frequency band is very small, the tapped-delay-line form of the predictors is poorly suited to filtering single-tones, and the approach requires a large amount of computation—particularly if a large number of carriers is used.

Another problem is that the jitter frequencies are not always known in advance—power supply and ringing frequencies vary from country to country, and other sources may generate significant components. Methods of identifying frequencies have been described, (e.g., the MUSIC algorithm described by R.O. Schmidt in "A Signal Subspace Approach to Multiple Emitter Location and Spectral Estimation", *Ph.D. Thesis*, Stanford University, 1981, and the ESPRIT algorithm described by R. Roy, A. Paulraj and T. Kailath in "ESPRIT—A Subspace Rotation Approach to Estimation of Parameters of Cisoids in Noise", *IEEE Trans. ASSP*, vol. ASSP-34, p. 1340–1342, October 1986) but they all require a very large amount of computation, and the particular problem of determining the frequencies of phase jitter has not been addressed.

Many of the early objections to multicarrier modulation were based on the assumption that correction for phase jitter was impossible because the problems of long symbol time and unknown jitter frequencies had not been, and probably could not be, satisfactorily solved.

SUMMARY OF THE INVENTION

In accordance with the preferred embodiment of the present invention, the problem of the symbol delay occurring inside the carrier recovery loop is solved by combining the concepts of the block processing needed for the efficient detection and decoding of multi-carrier signals with those of the serial processing needed to generate the local correcting signals that have the required compensating offset and jitter. In the present invention this is done by using feed-back (also known as closed-loop) algorithms or circuits in a combination of serial and block modes.

These feedback algorithms are designed, however, primarily for continuous operation while receiving data-modulated signals; their adaptation is fairly slow, and they presuppose a knowledge of the frequencies of the phase jitter components that are to be tracked.

Therefore, upon connection of a channel for the transmission of data, the data signal is preceded by a training signal comprising a few pilot tones. In the receiver these tones are separated by filtering, their phases are calculated as functions of time, and those functions are analyzed to form initial estimates of (a) clock offset, (b) carrier offset, and (c) the amplitudes, frequencies and phases of all significant components of phase jitter.

These estimates are then used to initialize the circuits or algorithms which generate a phase-correcting signal. This signal is used during the reception of data-modulated signals as follows:

1. In the serial mode, samples of the received signal are multiplied by the phase-correcting signal, which comprises components at the jitter and offset frequencies, to produce samples of a corrected signal.

2. A block of these corrected samples is then demodulated and decoded (as described, for example, in U.S. Pat. No. 4,679,227) to produce a block of estimated received data. These data, together with the demodulated (but not decoded samples), are used both to update the estimates of the amplitude and phase characteristics of the channel, and as inputs to the algorithm or circuit for estimating carrier and clock offsets described in paragraph 5 below.

3. The block of received data is then remodulated to produce a sequence of samples of a reference signal, and in a serial mode the phases of these samples are compared to the phases of the corrected samples to generate a sequence of samples of phase error.

4. These samples of phase error are then analyzed to calculate required updates for the parameters of the algorithm or circuit that is used to generate the phase-correcting signal.

5. The differences between the demodulated and the decoded data are analyzed and filtered to form estimates of the remanent carrier and clock frequency offsets. The estimate of carrier offset is used to update a parameter of the circuit or algorithm that generates the phase-correcting signal and similarly, the estimate of clock offset is used to control either the original sampling time of the received signal or an interpolator which operates upon the samples.

6. The phase-correcting signal and sampling time thus updated are then used for reception of the next block of data signals, and steps 1 through 5, described above, are repeated for each subsequent block of data signals.

DESCRIPTION OF THE PREFERRED EMBODIMENT

Figure 1:
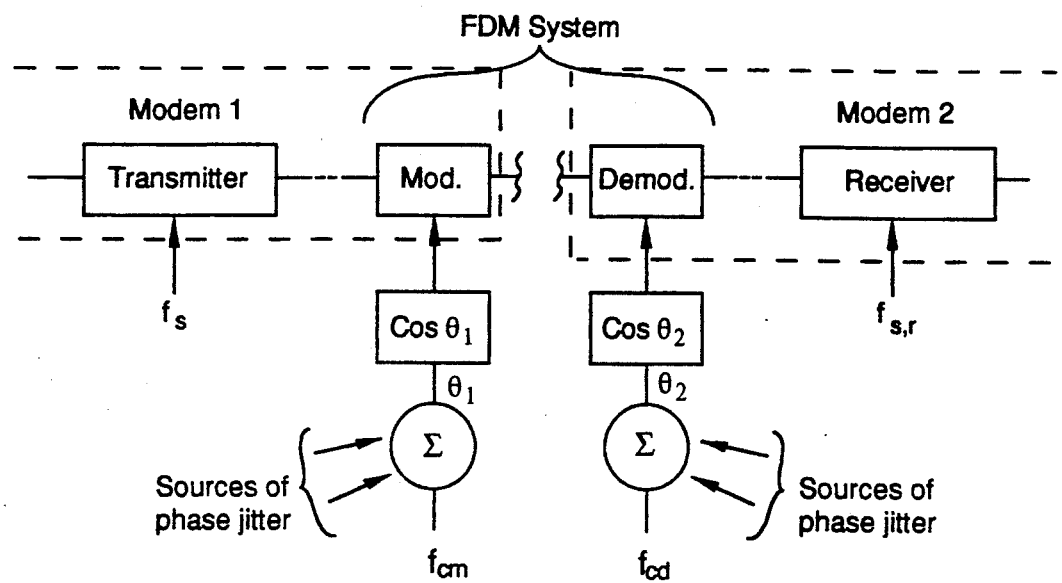
FIG. 1 is a schematic block diagram representation of a data transmission link subjected to clock and carrier frequency offsets and carrier phase jitter between a first and a second modem.

The transmitter of a first modem and receiver of a second modem of a data transmission link, such as is shown in FIG. 1, each include an oscillator (usually crystal-controlled) to control the frequency at which the transmit and receive signals are sampled, the data rates of those signals, and the frequencies of the carriers that are used for modulation.

Circuitry or signal processing algorithms are used in the receiver to lock the sampling rate in the receiver to that in the transmitter. Clock offset, $\epsilon$, is defined by the ratio of the natural (i.e., unlocked) sampling rate in the receiver, $f_{sr}$, to that used in the transmitter, $f_s$:

$$f_{sr} = (1+\epsilon)f_s \qquad (1)$$

Circuitry or algorithms are also used to lock the frequencies of the carriers used for demodulation to those inherent in the received signal. The common frequency difference (offset) between the received carriers and the natural, unlocked frequencies of the receiver, which may be caused by a combination of the differences between the frequencies of (a) the transmitter and receiver oscillators, and (b) the oscillators in the modulator and demodulator of the FDM equipment (shown as $f_{cm}$ and $f_{cd}$), is defined as $\Delta f$.

The oscillators in the FDM equipment may be subjected to phase jitter; the sources are typically additive and their sum affects the phase of the modulating and/or demodulating carrier as shown in FIG. 1. To simplify the explanation of the invention, it will be assumed that there is significant phase jitter at only two frequencies, $f_1$ and $f_2$, and that the jitter components have amplitudes $A_1$ and $A_2$, and phases $\Theta_1$ and $\Theta_2$. Each component of the received signal at a frequency f, could then be represented:

without jitter: $\sin[\omega t + \Theta]$ with jitter:

$$\sin[\omega t + \Theta + A_{j1}\sin(\omega_{j1}t + \Theta_{j1}) + A_{j2}\sin(\omega_{j2}t + \Theta_{j2})]$$

where, for all frequencies (of signal and jitter), $$\omega = 2\pi f$$

Figure 2:
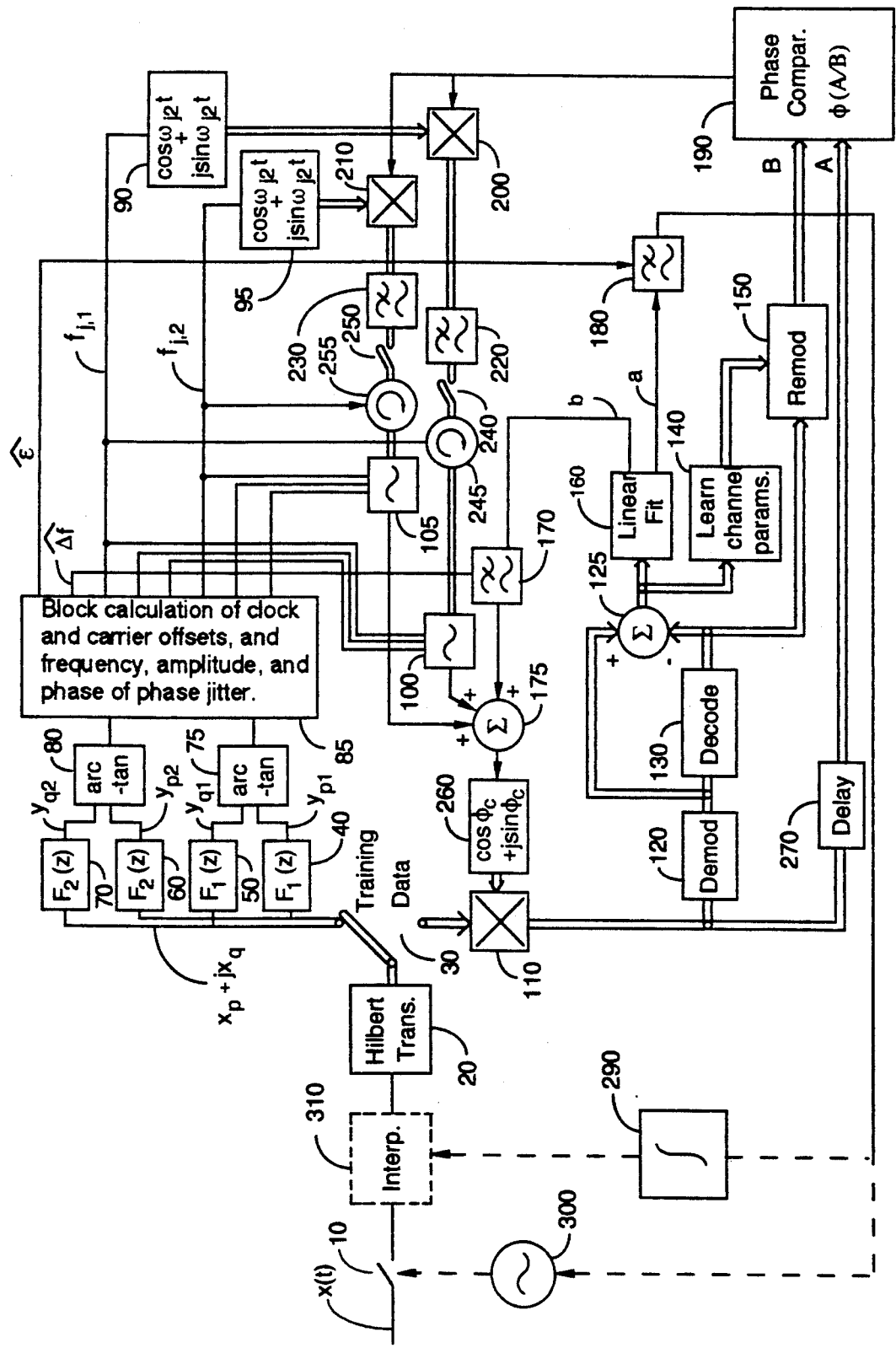
FIG. 2 is an overall block diagram of an embodiment of the present invention showing the feed-forward training mode and the feed-back data mode.

As shown in FIG. 2, a real received signal, $x(t)$, which may have been corrupted in this way, is first sampled by switch 10 at a rate $f_{sr}(=1/T_r)$ and with a timing offset, $\tau$, and converted to a complex signal, $x_p(nT_r+\tau)+jx_q(nT_r+\tau)$, by a Hilbert transformer 20 (see, for example, L. R. Rabiner and R. W. Schafer, "On the Behavior of Minmax FIR Digital Hilbert Transformers", *Bell Syst. Tech. J.*, vol. 53, pp. 363–390, Febuary 1974). Upon first connection of a data channel the training algorithm is used; this is represented symbolically in FIG. 2 by switch 30 in the "Training" position.

Training Mode

The training signal, from the transmitter of FIG. 1, comprises two pilot tones at frequencies $f_1$ and $f_2$ (1000 and 2000 Hz in the first embodiment). It is sampled by switch 10, transformed by the Hilbert transformer 20, and then processed as follows:

1. The real and imaginary parts (also known as the in-phase and quadrature components) of these tones are separated by band-pass filters 40–70 to generate the sampled signals $y_{p1}(n)$, $y_{q1}(n)$, $y_{q2}(n)$, and $y_{q2}(n)$. Ideally the response of each of these filters should be maximum at one of the pilot tone frequencies and zero at the other. Typical transfer functions—in terms of the z-transform variable, z, are $$F_1(z) = \frac{Y_{p1}(z)}{X_p(z)} = \frac{Y_{q1}(z)}{X_q(z)} = \frac{z^2 - 2\cos\Theta_2 z + 1}{z^2 - 2r\cos\Theta_1 z + r^2} \quad (2a)$$

and $$F_2(z) = \frac{Y_{p2}(z)}{X_p(z)} = \frac{Y_{q2}(z)}{X_q(z)} = \frac{z^2 - 2r\cos\Theta_1 z + 1}{z^2 - 2r\cos\Theta_2 z + r^2} \quad (2b)$$

where $\Theta_i = 2\pi f_i/f_s$ for $i = 1, 2$.

2. The output signals of the four filters are applied to arctangent operators 75 and 80, which calculate the phases of each pair of samples, taken at times $t = nT_r + \tau$, the two separated tones according to $$\phi_i(n) = \arctan(y_{qi}(n)/y_{pi}(n)); \quad (3)$$

The phases of a number (preferably an integer power of 2, and equal to 1024 in the preferred embodiment) of samples are calculated sequentially and stored; they are then processed as a block in processor 85 as described in steps 3–5.

Figure 3:
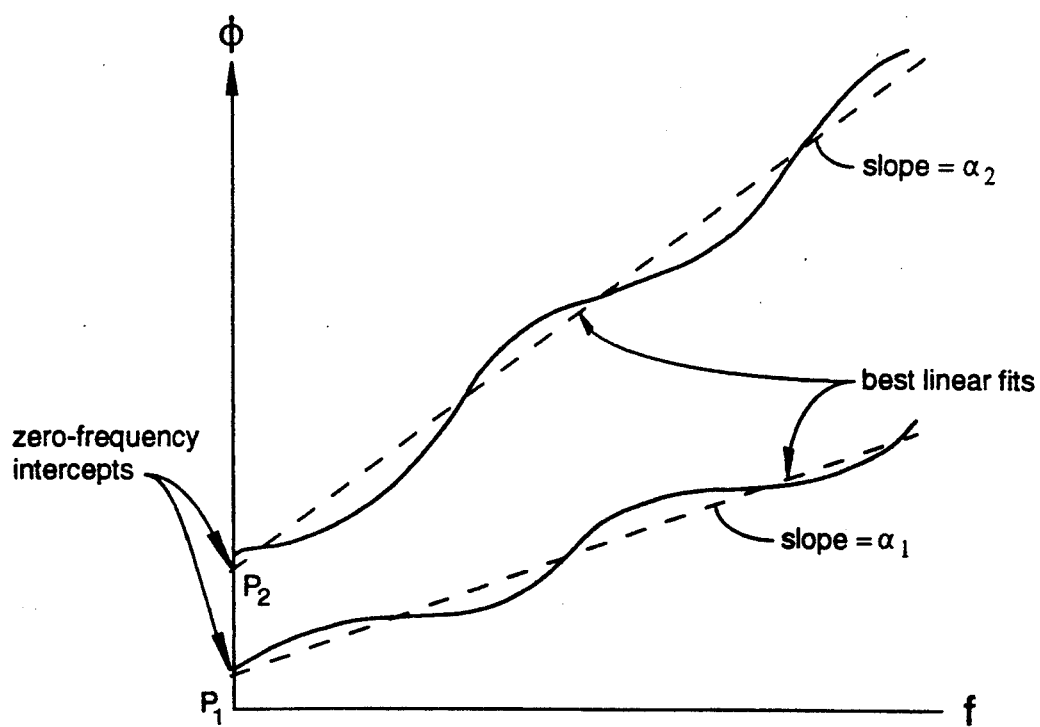
FIG. 3 shows a typical phase/time plot for the two pilot tones for the case of just one jitter component.

3. Each phase, $\phi_1(n)$ and $\phi_2(n)$, is fitted to a linear function of time (measured in increments of $T_r$ by the variable n) using the well known Least Mean Squared Error (LMSE) criterion (see, for example, B. Widrow and S. D. Stearns, *Adaptive Signal Processing*, Prentice Hall, 1985); that is, $$\phi_i(n) \approx \alpha_1 n + p_i \text{ for } i = 1, 2, \quad (4)$$

where $\alpha_1$, $p_1$, $\alpha_2$, and $p_2$ are the LMS estimates of the slope and zero-time intercept of each phase. An example of phases $\phi_1$ and $\phi_2$ and the best linear fit to them is shown in FIG. 3 where, for sake of clarity, only one jitter component is shown.

4. The carrier and clock frequency offsets, $\Delta f$ and $\epsilon$, are then estimated from the slopes, $\alpha_1$ and $\alpha_2$:

$$\Delta f = \frac{\alpha_1 f_2 - \alpha_2 f_1}{\alpha_2 - \alpha_1} \quad (5a)$$

and $$1 + \epsilon = \frac{2\pi (f_2 - f_1)}{f_s (\alpha_2 - \alpha_1)} \quad (5b)$$

5. A spectral analysis ( a Fast Fourier Transform (FFT) was used in the first embodiment) is then performed on the residual, non-linear parts of the phase functions, $\phi_i'(n) = \phi_i(n) - \alpha_i n - p_i$ for $i = 1, 2$ to estimate the amplitude, $A_{jk}$, frequency, $f_{jk}$, and phase, $\Theta_{jk}$, of the components of phase jitter ($k = 1, 2$ for the illustrated case of two components).

6. After a few blocks (the first embodiment uses just one) of the two pilot tones have been transmitted, received, and processed the estimated values of $A_{jk}$, $f_{jk}$, and $\Theta_{jk}$ are used to calculate the coefficients and initial states of the sinewave generators 100 and 105. This completes the training mode.

Switch 30 is then placed in the data position, and processing continues with the reception of data modulated onto multiple carriers.

Data Mode

Carrier Recovery

1. Hilbert-transformed samples of the data-modulated multicarrier signal, x(t), which is assumed to be impaired by carrier frequency offset and phase jitter, are sequentially applied to multiplier 110, and there multiplied by samples of the correcting signal, $\cos\phi_c + j\sin\phi_c$, which are generated by the look-up table 260.

The output signals of multiplier 110 (the corrected samples) are assembled into a block, which is stored in delay 270 and also processed as follows:

2. The block of output signals from multiplier 110 is input to demodulator 120, which performs an FFT on the block of samples of the corrected signal, as described by E. O. Brigham in *The FFT and Its Applications*, Prentice Hall, 1974 (a general theory of FFTs), and by D. Hughes-Hartogs in U.S. Pat. No. 4,679,227 (the application of FFTs to multicarrier modulation). The output from 120 is applied to decoder 130, which estimates the transmitted data, as also described in U.S. Pat. No. 4,679,227.

3. The output signals from demodulator 120 and decoder 130 are applied to subtractor 125; the output signals from 125, which are the amplitude and phase differences between the demodulated and the decoded signals, are applied to processor 140, where a sub-routine estimates the characteristics of the channel as described in U.S. Pat. No. 4,679,227.

4. The estimates from the sub-routine of processor 140, which are updated after the reception of each block of data, are then applied, together with the estimates of the transmitted data from decoder 130, to a remodulator 150 which performs an inverse FFT and generates a reference signal B.

Figure 5:
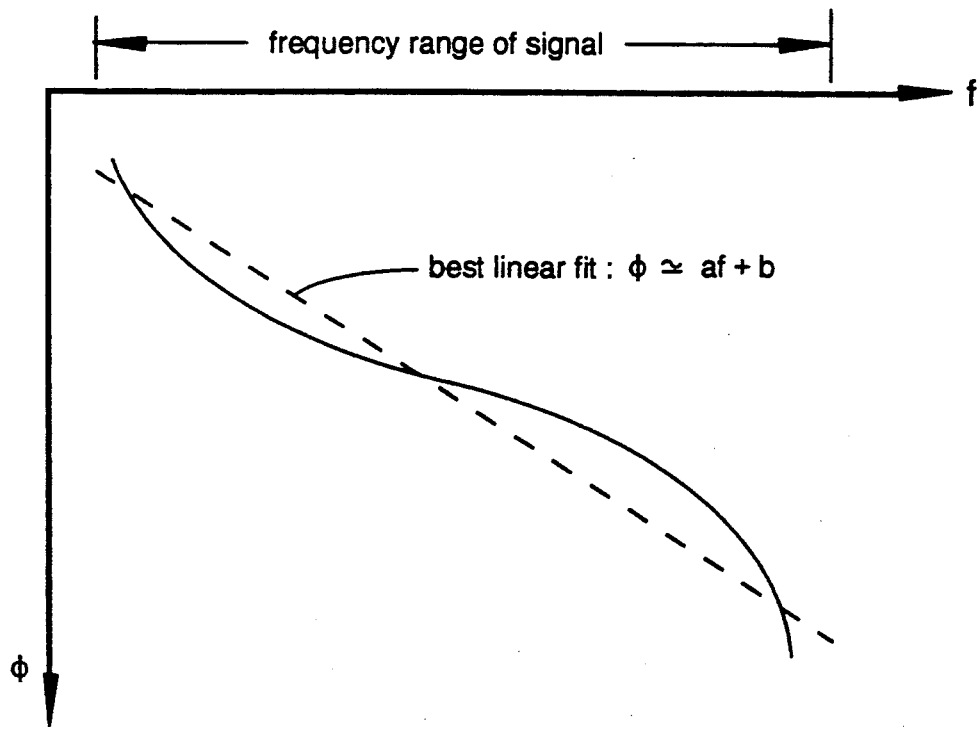
FIG. 5 shows a typical phase/frequency plot for many carriers.

5. The phase differences from subtractor 125 are also applied to processor 160, where a linear fit sub-routine calculates an LMSE fit of the phases to a linear function of frequency, af+b, as illustrated in FIG. 5. The constant term, b, is attributed to an error in the phase of the synthesized correcting signal, and a signal representative of b is applied to low-pass filter 170.

6. Phase comparator 190 then calculates, sequentially, samples of a phase-error signal which is the difference in phase between the corrected signal, A, which has been stored in delay 270, and the reference signal, B, from remodulator 150. If the two signals are represented as $(x_p(n) + jx_q(n))$ and $(y_p(n) + jy_q(n))$, respectively, then this phase difference is given exactly by $$\phi_e(n) = \arctan\left(\frac{x_q(n)y_p(n) - x_p(n)y_q(n)}{x_p(n)y_p(n) + x_q(n)y_q(n)}\right) \quad (8)$$

However, because the loop was initializing during the

However, because training phase, the differences between the corrected and reference signals are small, and the arctangent function of equation (8) can be approximated by its argument. Furthermore it was found that the division operation in the argument of the arctangent function can be dispensed with, and a simplified indicator of the phase-error, $$\phi_e(n) \approx x_q(n)y_p(n) - x_p(n)y_q(n) \qquad (9)$$

can be used; this is applied to multipliers 200 and 210.

7. In multipliers 200 and 210 the samples of the phase-error signal, $\phi_e$, are multiplied by samples of cosine and sine waves (i.e., complex samples) at the identified jitter frequencies, which are generated by look-up tables 90 and 95. The complex products of these multiplications are then applied to low-pass filters 220 and 230, respectively. Filters 220 and 230 typically have transfer functions of the form $$F(z) = \frac{K(z - z_1)}{(z - 1)(z - z_2)} \qquad (10)$$

and the gain, zero, and pole (K, $z_1$, and $z_2$) are chosen according to conventional PLL theory, as described by F. M. Gardner in *Phaselock Techniques,* John Wiley, 1979, so as to optimize the transient response of the loop.

The operations of multiplying and low-pass filtering together constitute a correlation of the phase error signal with each of the complex jitter components.

8. Steps 6 and 7 are performed for the duration of one block, and then the output signals of filters 220 and 230 are sampled by switches 240 and 250, respectively, to produce an estimate of each component of the phase error of the correcting signal. These error components, which are calculated during one block will be used, however, to update the parameters of the correcting signal that will be used for the subsequent block. Therefore, because the block period is not necessarily an interger multiple of the period of either of the jitter components, each component must be shifted, in rotators 245 and 255, by an angle $\omega_{jk}T (=2\pi f_{jk}T)$, which is the angle by which each identified jitter component will rotate in one block period. The sampled and rotated error components are then used to update the parameters of sinewave generators 100 and 105, which then continue undisturbed during the next block.

Figure 4:
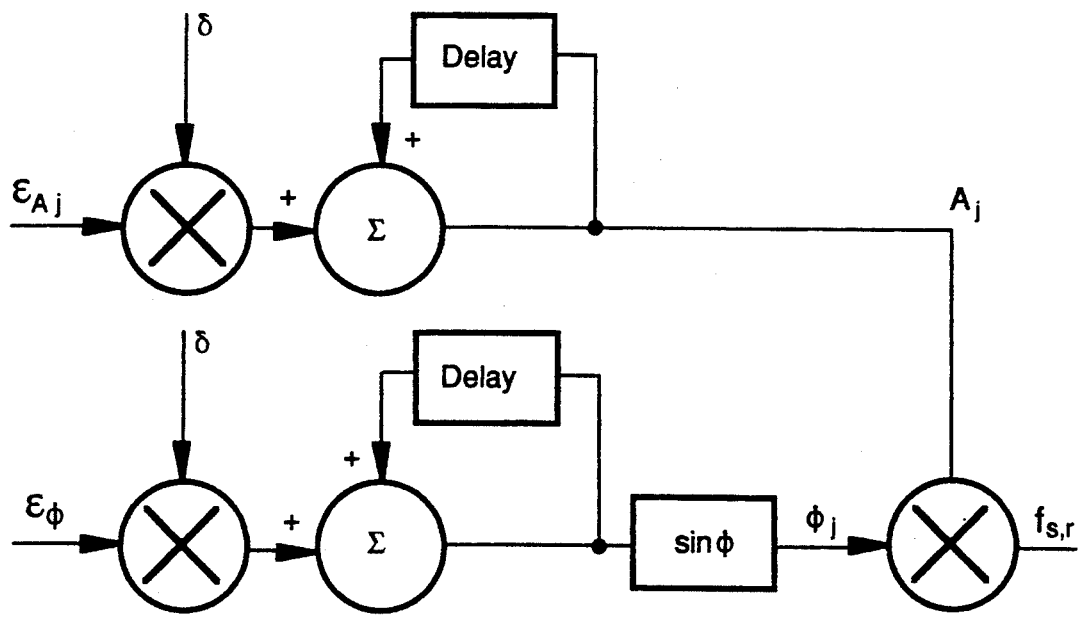
FIG. 4 shows a look-up table implementation of a generator of one sinusoidal component of the phase-correcting signal, with means for updating the amplitude and phase.

Sinewave generators 100 and 105 may be implemented in several different ways, and the preferred method of updating them depends on the implementation. In the preferred embodiment, shown in FIG. 4 the real and imaginary parts of the error components, $\epsilon_p$ and $\epsilon_q$ are converted to amplitude and phase errors, $\epsilon_A$ and $\epsilon_\phi$, and these errors are then used to increment the amplitude, $A_{jk}$ and phase, $\phi_{jk}$, of each component of the correcting signal according to $$A_{jk}' = A_{jk} + \delta\epsilon_A k$$

and $\phi_{jk}' = \phi_{jk} + \delta\epsilon_\phi k$ where $\delta$ is a small step-size multiplier. The updated phase, $\phi_{jk}$, is then used as an address for a cosine and sinewave look-up table, and the two output signals are multiplied by the updated amplitude.

9. The real output signals of sinewave generators 100 and 105 and of filter 170 are applied to a summer 175 to form a composite correcting phase angle, $$\phi_c = 2\pi\Delta fnT_r + \sum_{K=1}^{2} A_{jk}\cos(2\pi f_{jk}nT_r + \Theta_{jk})$$

which is the estimate of the phase shift required to compensate for offset and jitter. This $\phi_c$ is then applied to the sine and cosine look-up tables 260 in order to generate samples of a complex correcting signal.

Clock Recovery

The slope term, a, calculated by the linear fit algorithm 160, (described in Data Mode paragraph 5), is attributed to an error in the sampling phase, $\tau$, and is applied to low-pass filter 180. A typical transfer function of this filter, in terms of the z variable, is $$F(z) = K\frac{z - z_1}{z - z_2},$$

and the zero, $z_1$, and pole, $z_2$, can be chosen according to standard PLL theory so as to achieve a compromise between transient response and noise bandwidth.

The output signal of this filter may be used in one of two ways (as indicated by the dotted lines in FIG. 2):

(a) it may be fed back to a Voltage Controlled Oscillator (VCO) 300, which is used to control the first sampling switch 10, or (b) the switch 10 may be controlled by an unadjusted (open-loop) oscillator, and the output of the filter integrated in integrator 290 and then used to control an interpolator 310 as described, for example, in R. W. Schafer and L. R. Rabiner, "A Digital Signal Processing Approach to Interpolation", *Proc., IEEE,* June 1973.

It will be apparent to those skilled in the art that the invention disclosed herein may be embodied in other specific forms without departing from the spirit and essential characteristics thereof. Accordingly, the disclosure of the present invention is intended to be illustrative, but not limiting of the scope of the invention that is set out in the following claims.

I claim:

1. A method for estimating, and compensating for phase jitter imposed on a received multicarrier signal by imperfect components in a transmission medium, said method comprising the steps of:

(a) multiplying said multicarrier signal received during a time interval by a locally generated correcting signal to produce a corrected received multicarrier signal, in which said locally generated correcting signal is an estimate of the phase shift required to correct for the effects of said phase jitter;

(b) generating a reference signal by demodulating and then decoding said corrected multicarrier signal to produce an estimate of the transmitted data, and then remodulating said data to produce a reference signal;

(c) calculating a phase-error signal which is the difference between the phase of said correcting multicarrier signal and that of said reference signal;

(d) filtering the calculated phase-error signal of step (b) to generate an estimate of the changes required to the parameters of said locally generated correcting signal, said parameters being the amplitudes, frequencies, and phases of a plurality of components of said correcting signal, or any equivalent set which contains the same information;

(e) updating the parameters of step (d) by said changes to generate new parameters of said correcting signal; and (f) repeating steps (a) to (e) in each subsequent time interval.

2. The method of claim 1 further including the steps of:

(g) sampling said received multicarrier signal in synchronism with a locally generated clock signal;

(h) assembling the samples of step (g) into a block;

(i) performing the updating of step (e) after the reception of each block; and (j) multiplying the samples in a subsequent block of said received multicarrier signal by said correcting signal, which is defined by said new parameters.

3. The method of claim 2 wherein said reference signal is calculated by the steps of:

(k) demodulating and decoding said corrected received multicarrier signal to estimate what data was modulated onto each of the many carriers;

(l) filtering the results of said demodulating and decoding in order to estimate the amplitude and corrected phase responses of said transmission medium at each of the many carrier frequencies;

(m) remodulating said carriers with said estimated data, using said amplitude and phase responses, to generate, as a reference, an ideal received multicarrier signal which has no phase jitter; and (n) comparing said corrected received multicarrier signal with said remodulated, reference signal to generate said phase-error signal.

4. The method of claim 3 wherein said correcting signal comprises components at several frequencies, called jitter frequencies, at which it has been determined that there is phase jitter, further including the steps of:

(o) correlating said phase-error signal with complex sinusoidal signals at said jitter frequencies; and (p) using the results of said correlations to define the changes that should be made to the parameters of several sinewave generators, which generate components, at the identified jitter frequencies, of said correcting signal.

5. The method of claim 4 wherein said parameters are the addresses of look-up tables and the multipliers that are applied to the output signals of said tables in order to generate the components of said correcting signal.

6. The method of claim 1 further comprising the step of:

(q) dividing said received multicarrier blocks using Fast Fourier Transform (FFT) and Inverse FFT (IFFT) algorithms before performing steps a. through f.

7. A method for calculating, in a modem that receives a multicarrier data signal which may be impaired by phase jitter, frequency offset and a difference between the frequencies of a locally generated sampling clock and the clock in a remote transmitting modem, the initial parameters of a locally generated correcting signal which corrects for said phase jitter, frequency offset and frequency difference, said method comprising the steps of:

(a) calculating the initial values of the parameters of said correcting signal during the reception of a training signal comprising a plurality of pilot tones;

(b) separating said pilot tones by bandpass filters, and calculating their phases at successive sampling times;

(c) analyzing said phases to identify linear and sinusoidal functions of time;

(d) estimating the frequencies, amplitudes and phases of said sinusoidal functions of time;

(e) using the estimates of step (d) to initialize the parameters of sinewave generators;

(f) comparing the slopes of said linear functions of step (c), and generating an estimate of both said frequency offset and said clock frequency difference;

(g) using said estimate of said frequency offset to initialize the zero-frequency component of said correcting signal;

(h) using said estimate of the clock frequency difference to initialize the state of a low-pass filter; and (i) using the output signal of said low-pass filter to control an interpolator which interpolates between samples taken in synchronism with a locally generated clock signal to generate samples at the frequency of the clock in a remote transmitting modem.

8. The method of claim 7 wherein the output signal of said low-pass filter is used to control a phase-locked loop which adjusts the frequency and phase of said locally generated clock to match that of the clock in a remote transmitting modem.

9. The method of claim 7 wherein the samples of the receive signal are processed in blocks using FFT and IFFT algorithms.

10. The method of claim 7 wherein the frequencies, amplitudes and phases of said sinsoidal functions of time are estimated by performing an FFT on the sets of phases of a plurality of pilot tones.

11. The apparatus of claim 10 further including means for estimating the frequencies of said components of phase jitter by performing an FFT on the sets of phases of said pilot tones.

12. Apparatus for estimating, and compensating for phase jitter imposed on a received multicarrier signal by imperfect components in a transmission medium, said apparatus comprising: means for multiplying said multicarrier signal received during a time interval by a locally generated correcting signal to produce a corrected received multicarrier signal, wherein said locally generated correcting signal is an estimate of the phase shift required to correct for the effects of said phase jitter;

means for demodulating and then decoding said corrected multicarrier signal, estimating the transmitted data, and then remodulating said data to form said reference signal;

means for calculating a phase-error signal which is the difference between the phase of said corrected multicarier signal and that of said reference signal;

means for filtering said phase-error signal to generate an estimate of the changes required to the parameters of said locally generated correcting signal;

means for updating said parameters by said changes to generate new parameters of said correcting signal; and means for repeating the operation of the multiplying, calculating, filtering, and updating means in each subsequent time interval.

13. The apparatus of claim 12 further including:

means for sampling said received multicarrier signal in synchronism with a locally generated clock signal;

buffer means for assembling the samples of the sampling means into a block;

means for performing the updating of said parameters after the reception of each block; and means for multiplying the samples in a subsequent block of said received multicarrier signal by said correcting signal, defined by said new parameters.

14. The apparatus of 13 further including:

means for calculating said correcting signal by demodulating and then decoding said corrected multicarrier signal to estimate what data was modulated onto each of the many carriers;

means for filtering the results from said demodulating and decoding means in order to estimate the amplitude and corrected phase responses of said transmission medium at each of the carrier frequencies;

means for remodulating said carriers with said estimated data, using said amplitude and phase responses, to generate, as a reference, an ideal received multicarrier signal which has no phase jitter; and means for comparing said corrected received multicarrier signal with said remodulated, reference signal to generate said phase-error signal.

15. The apparatus of claim 14 adapted to the situation in which said correcting signal comprises components at several frequencies, called jitter frequencies, at which it has been determined that there is significant phase jitter, said apparatus further including:

means for correlating said phase-error signal with complex sinusoidal signals at said jitter frequencies;

means for generating samples of cosine and sine waves of defined amplitudes and phases at each of said jitter frequencies;

means for using the results of said correlation operations to define the changes that should be made to said amplitudes and phases; and means for summing said samples of cosine and sine waves to generate said correcting signal.

16. The apparatus of claim 15 wherein said cosine and sine wave generators are implemented by look-up tables and multipliers, wherein said look-up tables generate components of said correcting signal with the required frequency and phase, and said multipliers adjust the amplitudes of said components.

17. The apparatus of claim 12 further including means for processing samples of said received multicarrier signal in blocks using Fast Fourier Transform (FFT) and Inverse FFT (IFFT) algorithms.

18. Apparatus for calculating, in a modem that receives a multicarrier data signal which may be impaired by phase jitter, frequency offset and a difference between the frequencies of a locally generated sampling clock and the clock in a remote transmitting modem, the initial parameters of a locally generated correcting signal which corrects for said impairments, said apparatus comprising:

means for calculating the initial values of the parameters of said correcting signal during the reception of a training signal comprising a plurality of pilot tones;

means for separating said pilot tones by bandpass filters, and calculating their phases at successive sampling times;

means for analyzing said phase to identify linear and sinusoidal functions of time;

means for estimating the frequencies, amplitudes and phases of said sinusoidal functions of time;

means for using the estimates produced by said estimating means to initialize the parameters of sine-wave generators;

means for comparing the slopes of said linear functions calculated by said analyzing means, and for generating an estimate of both said frequency offset and said clock frequency difference;

means for using said estimate of said frequency offset to initialize the zero-frequency component of said correcting signal;

means for using said estimate of the clock frequency difference to initialize the state of a low-pass filter; and means for using the output signal of said low-pass filter to control an interpolator which interpolates between samples taken in synchronism with a locally generated clock signal to generate samples at the frequency of the clock in a remote transmitting modem.

19. The apparatus of claim 18 wherein the output signal of said low-pass filter is used to control a phase-locked loop which adjusts the frequency and phase of said locally generated clock to match that of the clock in a remote transmitting modem.

20. The apparatus of claim 18 further including means for processing samples of said received multicarrier signal in blocks using FFT and IFF algorithms.

* * * * *